March 28, 1939.    G. A. PETROE    2,151,935
APPARATUS FOR HANDLING LIQUIDS
Filed June 11, 1936
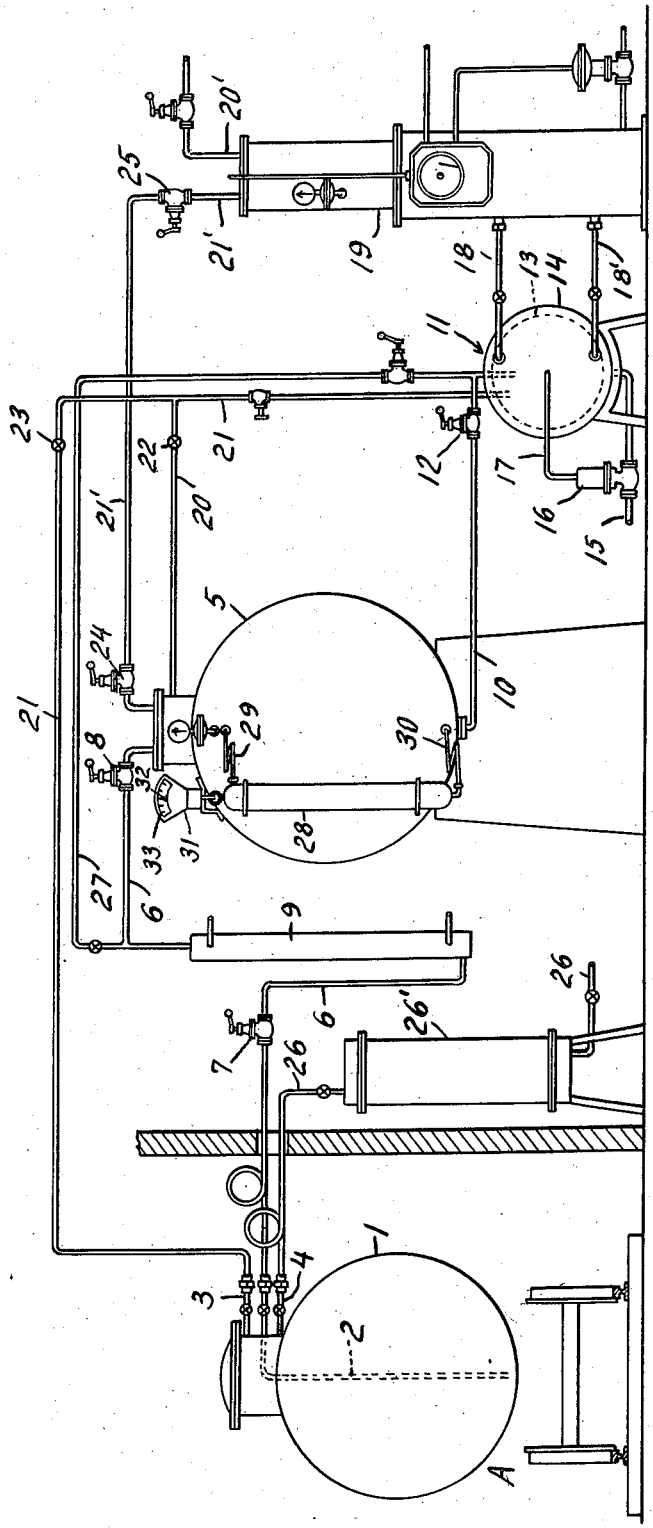
INVENTOR
Gregory A. Petroe
BY
Pennie Davis
Marvin & Edmunds
ATTORNEYS Patented Mar. 28, 1939

2,151,935

UNITED STATES PATENT OFFICE 2,151,935

APPARATUS FOR HANDLING LIQUIDS

Gregory A. Petroe, Niagara Falls, N. Y., assignor to The Mathieson Alkali Works, Inc., New York, N. Y., a corporation of Virginia Application June 11, 1936, Serial No. 84,674

6 Claims. (Cl. 62—1)

This invention relates to apparatus for handling liquids and more particularly to apparatus for unloading, storing, measuring and preparing for use liquids, such as liquefied chlorine gas, which are ordinarily handled in sealed containers.

In handling liquefied chlorine gas, for example, it has been the practice heretofore to ship the chlorine in tank cars to the plant where the chlorine is to be utilized for industrial purposes, and to provide apparatus for withdrawing the chlorine from the car tank as it is needed. This practice ordinarily involves the use of track scales for weighing the tank cars before and after unloading them, and, in order to have an adequate supply of chlorine available at all times, it is necessary to keep on hand several tank cars. Even when this precaution is taken there are frequent interruptions in the manufacturing operations due to the necessity for substituting loaded tank cars for the cars from which all of the chlorine has been discharged.

One of the objects of my invention is to provide adequate storage facilities for liquefied chlorine, or the like, so that the liquefied gas may be continuously supplied to the chlorinating or other equipment utilizing the liquefied gas. I prefer to employ a storage tank having a capacity such that the entire contents of a tank car may be transferred to the storage tank at one time so that there will be no delay in releasing the tank car for further use. By utilizing the storage tank for the liquid material, an adequate supply is always available and the liquid may be supplied to the plant equipment without any interruption. My invention contemplates the provision of measuring equipment for measuring the liquid removed from a tank car so that it is unnecessary to weigh the tank car before and after it is unloaded.

A further object of my invention is to provide an improved apparatus for unloading liquefied chlorine, and the like, from tank cars, regardless of the atmospheric temperature conditions prevailing at the time the unloading operation is performed. Heretofore difficulties have been encountered in unloading a material such as liquefied chlorine in very cold weather, and a feature of my invention is the provision of efficient means for supplying to the car tank a gas under sufficient pressure to readily discharge the liquefied material from the tank even at very low temperatures.

Another feature of my invention is the use of a gas pressure booster device which may be utilized for supplying gas under pressure to a liquefied gas supply tank and also for heating the fluid supplied to a vaporizer unit. The system is preferably arranged so that liquefied gas may be supplied to the pressure booster directly from the tank car, or from the storage tank, and suitable connections may be provided so that the high pressure gas generated in the pressure booster may be supplied either to the tank car for facilitating the discharge of liquefied gas therefrom, or to the storage tank, as may be desired. The pressure booster device may be utilized as an auxiliary storage receptacle so as to permit the continuous operation of the system while the main storage receptacle is being filled from the car, for supplying gas under pressure to the main storage receptacle, for supplying gas under pressure to the car tank or for preheating the liquid going to a vaporizer unit, as may be desired.

The various objects and advantages of my invention will be more apparent upon considering the following detailed description which relates to certain embodiments thereof diagrammatically illustrated in the single figure of the accompanying drawing.

The accompanying drawing illustrates a tank car A, the car tank 1 having suitable connections for discharging the liquefied gas or other liquid from the tank. For this purpose the tank may be provided with a discharge pipe 2 and with pipe connections 3 and 4 through which gas under pressure may be supplied to the upper portion of the tank.

I prefer to employ a storage tank 5 for receiving the liquid unloaded from the tank car. A pipe line 6 provided with suitable valves 7 and 8 may be employed for connecting the discharge pipe 2 of the car tank to the storage tank 5 and if desired a suitable heat exchanger 9 may be interposed in this pipe line for heating the liquid as it is transferred to the storage tank.

The storage tank 5 may be provided with a liquid discharge connection 10 for supplying liquid from the storage tank to what may be characterized as a pressure booster tank 11. A valve 12 may be employed for controlling the flow of liquid to the pressure booster tank. The pressure booster tank has an inner container 13 enclosed in a jacket 14. A heating medium such as steam may be supplied to the pressure booster tank jacket through a suitable connection such as that shown at 15 and if desired an automatic valve 16 may control the supply of this heating medium the valve being operated in response to a thermal element (not shown) in the pressure booster and connected to the valve as shown at 17. One or more fluid connections such as those shown at 18 and 18' may be used for discharging fluid from the pressure booster 11 to a vaporizing unit 19. This vaporizing unit 19 may be standard equipment and accordingly it is not regarded as essential to explain the details of construction thereof except to note that it is provided with a vapor discharge connection 20' and with another connection 21' communicating with the top of the storage tank 5 so that the storage tank may be vented into this low pressure apparatus as hereinafter explained.

With the apparatus illustrated in the accompanying drawing it is possible to unload the contents of a tank car into the storage tank 5 by opening the valves 7 and 8 in the liquid line 6 and supplying high pressure gas from the pressure booster to the car tank through the fluid connection 21. The supply of high pressure gas is generated in the pressure booster 11 by heating liquefied gas in the pressure booster. The valve 12 in the discharge line between the storage tank 5 and the pressure booster is closed when the pressure booster is utilized for discharging high pressure gas into the car tank. The pressure booster may continue to supply heated liquid to the vaporizer unit 19 through connection 18', (while gas is carried back to the pressure booster through 18 to prevent the vaporizer 19 being flooded). The operation of unloading the contents of the tank car into the storage tank may be facilitated by venting the storage tank into the vaporizer unit by opening the valves 24 and 25.

The storage tank 5 may have sufficient capacity to hold the entire contents of the tank car and after the tank car has been unloaded or after the desired quantity of liquid has been withdrawn from the tank car the valves 8 and 24 may be closed and the valve 22 in the pipe connection 20 opened so as to equalize the gas pressure in the pressure booster and in the storage tank. The valve 12 may then be opened to permit some of the liquid to flow from the storage tank into the pressure booster tank. To facilitate this operation the supply of heating medium to the pressure booster jacket may be cut off and a suitable cooling medium supplied to this jacket. When the pressures are equalized liquid flows by gravity into the pressure booster tank and into pipe 21 up to the level of the liquid in tank 5, leaving a gas space in the pressure booster tank from the end of the riser pipe 21 to the top of the inner container 13 of the pressure booster tank.

In unloading liquefied gas from the tank car according to the method above described I prefer to supply to the tank car a gas chemically the same as the liquefied gas therein. This insures that there will be no contamination of the liquefied gas in the system.

According to another method of handling a liquid in a system such as that illustrated in the accompanying drawing I may supply to the car tank compressed air for the purpose of forcing the liquefied gas, or other liquid, out of the car tank into the storage tank, by a compressed air connection as shown at 26. I may interpose in this compressed air connection a suitable air drying apparatus 26' for removing moisture from the air. This is important where the system is used for handling a liquefied gas such as chlorine gas which should not have moisture brought into contact with it because of the danger of corrosion.

The capacity of the pressure booster tank 11 should be such as to provide an adequate supply of high pressure gas under all operating conditions. In unloading liquefied gas in cold weather by utilizing a high pressure gas chemically the same as the liquefied gas in the tank car it is desirable to supply the high pressure gas to the car tank at a relatively high rate in order to maintain the desired pressure in the car tank. Under such conditions the cold liquid in the car tank and the cold walls of the tank have a tendency to reduce the temperature of the gas supplied to the tank and liquefy this gas, and, accordingly, I prefer to supply the gas at a rate more rapid than that at which it tends to liquefy in the car tank. In this way adequate pressure can be maintained in the car tank to force the liquid through the discharge line 6 into the storage tank and it is not necessary to raise the temperature of this liquid to any considerable extent in order to maintain the desired pressure in the car tank.

If for any reason it is desirable or essential to by-pass the liquid around the storage tank this may be accomplished by utilizing a suitable pipe connection 27 connecting the pipe line 6 directly with the pressure booster tank.

In order to measure the liquid transferred from the tank car to the storage tank 5 I prefer to employ improved measuring apparatus which comprises an auxiliary tank 28 connected at its top and bottom to the upper and lower portions respectively of the storage tank through flexible pipe connections 29 and 30. The auxiliary tank 28 is suspended from a weighing scale 31 having a pointer 32 and a graduated scale 33 which may be calibrated in terms of the quantity of liquid in the storage tank. The flexible connections 29 and 30 permit substantially free vertical movement of the measuring container 28 so that the scale reading gives an indication of the quantity of liquid in the auxiliary container 28. The flexible connection 29 serves to equalize the pressure in the upper portion of the weighing container 28 and in the upper portion of the storage tank 5 so that the liquid will seek the same level in both of these containers. The amount of liquid in the small container 28 thus bears a definite relation to the quantity of liquid in the storage tank. By utilizing such weighing apparatus in conjunction with the storage tank 5 it is feasible to determine the quantity of liquid unloaded from the tank car without the necessity of employing the usual track scales for weighing the tank car before and after it is unloaded.

My invention is particularly suitable for handling a liquefied gas such as liquefied chlorine and it provides a most efficient system for handling such a liquid under all conditions. It is frequently necessary to unload liquefied chlorine in cold weather when the temperature may be as low as −33° F. Under such conditions the vapor pressure of chlorine gas is zero but the unloading operation may be readily carried out by supplying high pressure chlorine gas to the car tank from the pressure booster at a rate sufficiently rapid to maintain the necessary pressure in the car tank. After the liquid has been transferred to the storage tank the valves 8 and 24 may be closed as explained above and the valve 22 opened to equalize the pressure in the storage tank and in the booster tank. The valve 12 may then be opened to allow fluid to flow out of the storage tank into the pressure booster. If desired, the liquefied gas may be preheated by supplying a suitable heating medium to the heat exchanger 9 in the pipe line 6. The pressure booster may serve not only as a means for supplying high pressure gas for unloading purposes but also as a preheater for heating the liquefied gas before it is supplied to the vaporizer unit 19. This has the effect of increasing the capacity of the vaporizer unit which serves to vaporize the liquefied gas to render it available for use in the manufacturing plant.

By utilizing a system embodying my invention it is possible to avoid operation interruptions due to the failure of the supply of liquefied gas. The capacity of the storage tank and of the pressure booster are preferably such as to insure an adequate supply while an empty tank car is being replaced by a loaded car. Ordinarily the heat exchanger 9 is utilized only in the event compressed air is employed for unloading liquefied gas; where high pressure gas from the pressure booster is employed the temperature of the liquefied gas is usually raised to some extent by its contact with the gas supplied from the pressure booster.

In handling chlorine, the vaporizer unit comprising the pressure booster 11 and the vaporizer unit 19 may be utilized for raising the chlorine temperature from a possible minimum of −33° F. to an operating temperature of +30° F. The pressure booster preferably has sufficient capacity to supply high pressure chlorine gas to the car tank and also to supply preheated fluid to the vaporizer unit 19 while unloading the tank car.

It is to be understood that my invention is not limited to the particular embodiments thereof illustrated and described but includes such modifications thereof as fall within the scope of the appended claims.

I claim:

1. Apparatus for unloading liquefied gas from a tank car, comprising a storage tank, a fluid connection for connecting the storage tank to the car tank, a pressure booster tank, separate fluid connections between the pressure booster tank and the storage tank and between the pressure booster tank and the car tank, and means for heating liquefied gas in the pressure booster tank to generate sufficient gas pressure therein and in the fluid connection connecting the same with the car tank to force liquefied gas from the car tank into the storage tank.

2. Apparatus for unloading liquefied gas from a tank car comprising a storage tank, a fluid connection for connecting the storage tank to the car tank, means for withdrawing liquefied gas from the storage tank and for vaporizing the same and returning it to the car tank to build up sufficient pressure therein to force the liquefied gas therein into the storage tank.

3. In a system of the type described, the combination of a liquefied gas supply tank, a vaporizer unit, a pressure booster tank communicating with said supply tank, means for heating liquefied gas in said pressure booster tank, and means whereby the heated fluid may be supplied from said booster tank to said vaporizer unit, and to said supply tank to force liquefied gas therefrom into the pressure booster tank.

4. In a system comprising apparatus for unloading liquefied gas from a tank car, the combination of a vaporizer unit, a storage tank, a pressure booster tank and fluid connections between the vaporizer units and the booster tank and between the booster tank and the storage tank and between the booster tank and the car tank, and means for heating liquefied gas in the booster tank, said apparatus being arranged so that the heated fluid may be supplied from the booster tank to the storage tank or to the car tank and also supplied from the booster tank to the vaporizer unit.

5. In a system comprising apparatus for unloading liquefied gas from a tank car, the combination of a storage tank, a pressure booster tank, a vaporizer unit, means for conducting liquefied gas from the car tank to the storage tank, means for heating liquefied gas in the booster tank and for discharging gas from the booster tank into the car tank, and means for venting the storage tank into the vaporizer unit.

6. In a system comprising apparatus for unloading liquefied gas from a tank car, the combination of a vaporizer unit, a pressure booster tank communicating with the car tank, means for heating liquefied gas in said pressure booster tank, means whereby the heated fluid may be supplied from said booster tank to said vaporizer unit, and means whereby vaporized gas may be conveyed to the car tank to force the liquefied gas therefrom into the pressure booster tank.

GREGORY A. PETROE.